UNITED STATES PATENT OFFICE.

MYRTIL KAHN AND FRIEDRICH RUNKEL, OF ELBERFELD, GERMANY, ASSIGNORS TO THE FARBENFABRIKEN, VORMALS FR. BAYER & CO., OF SAME PLACE.

BLACK AZO DYE.

SPECIFICATION forming part of Letters Patent No. 594,996, dated December 7, 1897.

Application filed August 6, 1897. Serial No. 647,330. (Specimens.) Patented in England December 4, 1894, No. 23,584; in France April 20, 1895, No. 246,760, and in Italy June 30, 1895, XXX, 38,758, LXXVI, 51.

*To all whom it may concern:*

Be it known that we, MYRTIL KAHN and FRIEDRICH RUNKEL, chemists, doctors of philosophy, subjects of the German Emperor, residing at Elberfeld, Prussia, Germany, (assignors to the FARBENFABRIKEN, VORMALS FR. BAYER & CO., of Elberfeld, Prussia, Germany,) have invented a new and useful Improvement in the Manufacture of Black Azo Dyes, (for which the aforesaid FARBENFABRIKEN, VORMALS FR. BAYER & CO., have already obtained Letters Patent in England, No. 23,584, dated December 4, 1894; in France, No. 246,760, dated April 20, 1895; and in Italy, Reg. Gen., Vol. 30, No. 38,758, Reg. Att., Vol. 76, No. 51, dated June 30, 1895,) of which the following is a specification.

Our invention relates to the production of a new substantive black azo dye by combining one molecule of the tetrazo derivative of paradiamidodiphenylaminmonosulfonic acid having the constitution formula

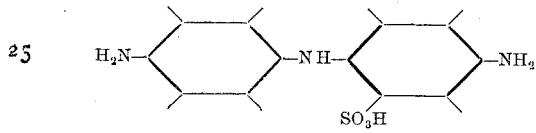

with one molecule of the alphanaphthylaminbetasulfonic acid 1.6 or 1.7, or of salts thereof, coupling the intermediate product thus obtained with one molecular proportion of amidonaphtholsulfonic acid G, or of salts thereof, rediazotizing the disazo compound thus obtained or produced in another suitable manner, and finally combining with two molecular proportions of a metadiamin, such as metaphenylenediamin or metatoluylenediamin.

In carrying out our process practically we can proceed as follows: 27.9 kilos, by weight, of diamidodiphenylaminsulfonic acid are diazotized in the usual manner by means of fourteen kilos, by weight, of sodium nitrite. To the tetrazo solution thus obtained 24.5 kilos, by weight, of the sodium salt of alpha-naphthylaminbetasulfonic acid 1.6 dissolved in a sufficient quantity of water and an excess of sodium acetate is added with stirring. The intermediate product begins to form immediately, and the formation will be finished after well stirring the mixture for about one hour. The reaction mixture is then stirred into a solution of twenty-four kilos, by weight, of amidonaphtholsulfonic acid G, rendered alkaline by means of carbonate of sodium, care being taken that the reaction of the mixture remains alkaline during the whole process. The formation of the disazo body will be finished after stirring the mixture for about three hours. Subsequently the mixture is strongly acidulated with the aid of hydrochloric acid and diazotized in the usual manner by means of fourteen kilos, by weight, of sodium nitrite. After about twelve hours the separated finished diazo compound is filtered from the acid solution, and the thick paste thus obtained is stirred into a watery solution containing twenty-two kilos, by weight, of metaphenylenediamin and twenty-eight kilos of sodium acetate. The dyestuff begins to form immediately. After stirring this mixture for about two hours it is heated to about 60° centigrade and rendered alkaline by the addition of sodium carbonate. Finally the dyestuff is separated by adding a sufficient quantity of common salt, filtered off, dried, and pulverized. It represents a brownish-black powder, readily soluble in hot water with a violet-black color in a twenty-per-cent. ammonia liquor, with a bluish-black color insoluble in alcohol, in a strong soda-lye, and in concentrated hydrochloric acid. By concentrated sulfuric acid of 66° Baumé it is dissolved with a black color, which changes into bluish-black on the addition of a small quantity of ice, a violet-black precipitate being separated in case a larger quantity of ice be added to the sulfuric-acid solution. On the addition of acids to a watery solution of the dyestuff a black precipitate is separated.

The dyestuff yields on unmordanted cotton deep bluish-black shades, which are fast to acids, to alkalies, and against the action of light. It has the following formula:

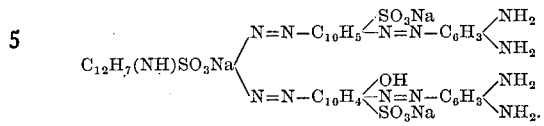

Having now described our invention and in what manner the same is to be performed, what we claim as new, and desire to secure by Letters Patent, is—

1. The process for producing a black azo dyestuff which process consists in combining equimolecular proportions of tetrazotized paradiamidodiphenylaminsulfonic acid with alphanaphthylaminbetasulfonic acid 1.6 or 1.7, coupling the intermediate product thus obtained with one molecular proportion of amidonaphtholsulfonic acid G, rediazotizing the disazo compound thus obtained and finally combining with two molecular proportions of a metadiamin, such as metaphenylenediamin or metatoluylenediamin, substantially as described.

2. As a new article of manufacture the black azo dyestuff derived from the diazotized mixed azo body from paradiamidodiphenylaminsulfonic acid, alphanaphthylaminbetasulfonic acid 1.6 or 1.7, and amidonaphtholsulfonic acid G by combination with two molecular proportions of a metadiamin, such as metaphenylenediamin and metatoluylenediamin, having when metaphenylenediamin is employed the formula

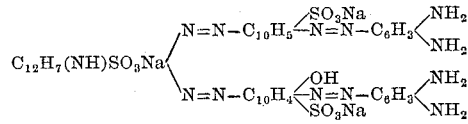

forming a brownish-black powder, readily soluble in hot water with a violet-black color, in a twenty-per-cent. ammonia liquor with a bluish-black color, insoluble in alcohol, in a strong soda-lye (35° Baumé) and in concentrated hydrochloric acid, soluble in concentrated sulfuric acid (66° Baumé) with a black color, which turns into bluish black on the addition of a small quantity of ice, while a violet-black precipitate is separated on the addition of a larger quantity of ice to the sulfuric-acid solution, yielding on unmordanted cotton deep bluish-black shades which are fast to acids, to alkalies and to light, substantially as described.

In testimony whereof we have signed our names in the presence of two subscribing witnesses.

MYRTIL KAHN.
FRIEDRICH RUNKEL.

Witnesses:
H. T. HESS,
OTTO KÖNIG.